United States Patent [11] 3,543,922

[72] Inventor Richard J. Charlton
Los Gatos, California
[21] Appl. No. 813,196
[22] Filed April 3, 1969
[45] Patented Dec. 1, 1970
[73] Assignee International Business Machines Corporation
Armonk, New York
a corporation of New York

[54] CONTAINER WITH EXTERNAL SHOCK ABSORBING STRUCTURE
9 Claims, 3 Drawing Figs.

[52] U.S. Cl. .......... 206/62, 206/46; 220/69, 220/85; 248/20, 340/174.1
[51] Int. Cl. .......... B65d 25/00, B65d 85/30
[50] Field of Search .......... 206/62, 62(P.R.)52, 52(F), 46(Fragile); 220/69, 70, 85(B); 340/174.1; 150/0.5; 190/37; 215/12; 248/22, 24, 19, 350, 358, 20

[56] References Cited
UNITED STATES PATENTS

| | | | |
|---|---|---|---|
| 2,893,665 | 7/1959 | Paulsen | 267/153 |
| 3,176,281 | 3/1965 | Pattison | 206/62(P.R.UX) |
| 3,305,227 | 2/1967 | Henley | 248/358 |
| 3,372,826 | 3/1968 | Heaton | 215/12 |
| 3,349,940 | 10/1967 | Cornelius | 220/59 |
| 3,465,875 | 9/1969 | McKelvey, Jr. | 206/52(F)UX |

*Primary Examiner*—William T. Dixson, Jr.
*Attorneys*—Hanifin and Jancin and John H. Holcombe

ABSTRACT: A container with a resilient, annular protrusion around the base of the container which extends both outwardly and downwardly therefrom to absorb impact energy from either the bottom or side of the container.

Patented Dec. 1, 1970

3,543,922

*INVENTOR*

RICHARD J. CHARLTON

*BY* John H. Holcombe

ATTORNEY

CONTAINER WITH EXTERNAL SHOCK ABSORBING STRUCTURE

BACKGROUND OF THE INVENTION

1. Field of the Invention

The invention relates to containers, and more particularly to protective containers for delicate objects, such as disk packs.

2. Description of the Prior Art

A delicate, portable object which is often moved about during its useful life is a disk pack for magnetic disk files. Magnetic disk files comprise a device for storing data for computing systems. The physical medium on which the data is stored is the disk pack. This data is written on and read from the disk pack by magnetic heads which are attached to and positioned by the file. The data comprises a plurality of closely spaced, circular tracks on each disk. Each track is read or written by positioning a magnetic head precisely in juxtaposition with the track while the disk pack is rotated about a central axis. In most files, this precise positioning is derived from accurate dimensional relationship between the disk, the pack hub upon which the disk is mounted, the spindle upon which the hub is mounted, the mounting of the spindle for rotation within the file, and the arm mounting the magnetic head within the frame of the file.

A disk pack normally comprises a plurality of disks and spacers, all held together in a unit, usually by means of bolts and a central hub. This unit is subject to misalignment if it receives a substantial sideward shock, the misalignment thereby rendering the disk pack useless since the magnetic head will no longer be alined with the associated track.

The disks of the pack are mounted on the hub so as to comprise a cantilever structure, the disks being relatively thin and extending, unsupported, a significant distance radially outward from the hub. The horizontal flatness of the disks is very important since the magnetic head is normally positioned closely adjacent the disk, spaced therefrom by an air bearing formed therebetween. The head must be completely withdrawn out of the disk pack to allow the pack to be removed from the file, and in most cases is to be moved from track to track on the disk. Hence, any disk droop must be held to a close horizontal tolerance to allow the necessary motion of the head.

The disks, being supported as cantilevers, are subject to substantial downward bending, or drooping, if the disk pack is dropped from as little a height as 2 inches. This bending also renders the pack useless since the heads cannot be inserted into or work properly with the disk pack.

Major advantages of disk packs as a storage medium is the ability to interchange a plurality of disk packs with a single file, or a single disk pack with a plurality of files. In practice, a disk pack is employed on a given file for only a relatively short period of time, less than an hour, and then moved into a storage area or to another magnetic disk file. The disk packs are designed so that they may only be removed from the disk files in a container. At present, containers for disk packs are designed to hold the disk pack rigidly against the bottom of the container and to completely enclose the disk pack to prevent the entry of foreign matter.

However, the disk pack in the container is often subject to being dropped or banged, and the container offers no shock protection to the pack. The frequency of occurrence of such dropping or banging is sufficient to cause a detrimental and costly effect upon the usage of data processing systems.

In recent years, the only improvements to containers for disk packs has been in the area of making the containers less breakable and more resistant to heat.

SUMMARY

An object of the present invention is to provide a container for disk packs to protect against shock by impact from either dropping or banging.

Briefly, the invention comprises an improvement to a container for delicate objects comprising a resilient, annular protrusion at and around the base of the container which extends outwardly and downwardly from the base of the container. The resilient protrusion thereby absorbs impact energy from either the bottom or side of the container.

DESCRIPTION OF THE PREFERRED EMBODIMENT

Figure 1:
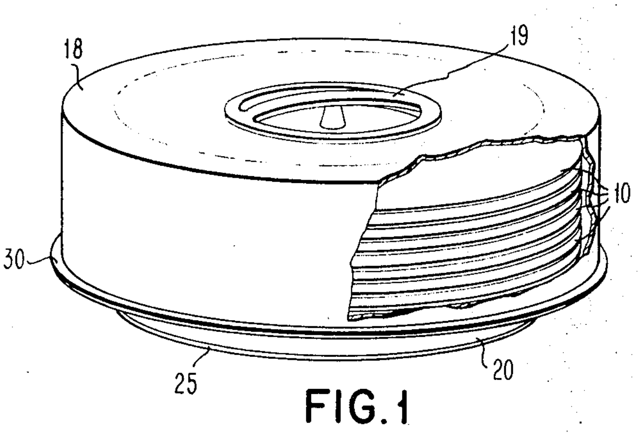
FIG. 1 is a perspective view of a container embodying the present invention.
Figure 2:
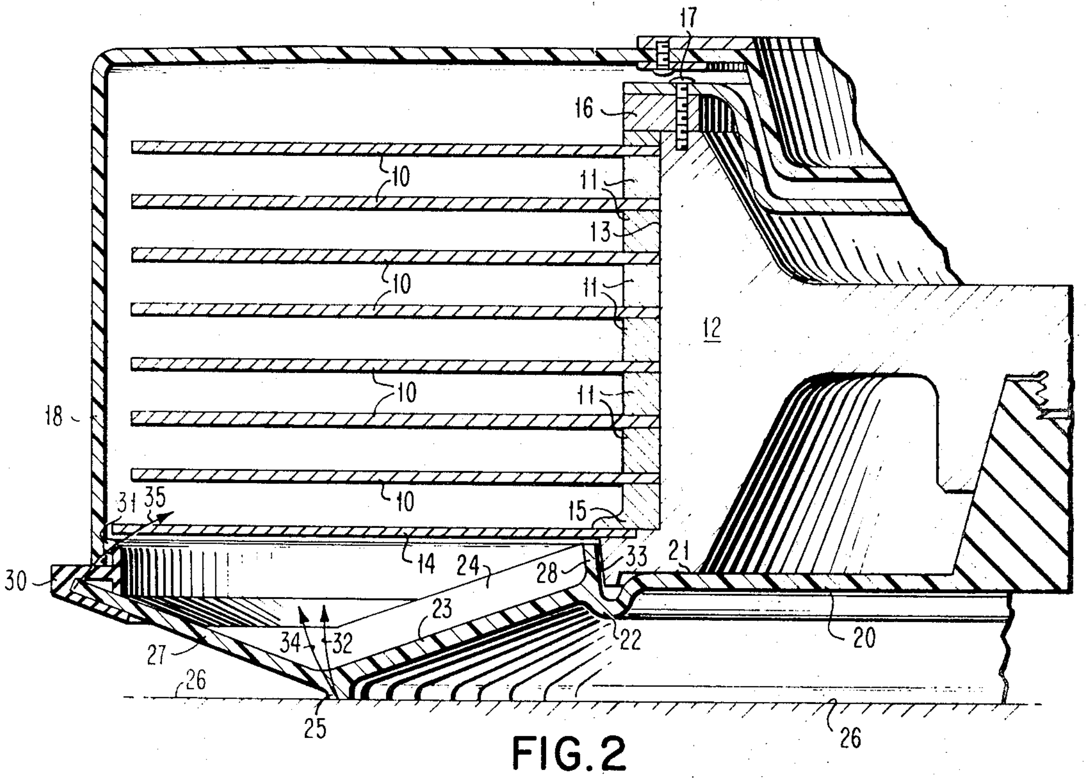
FIG. 2 is a cutaway, cross-sectional illustration of a portion of the container of Fig. 1.

Referring to FIGS. 1 and 2, a disk pack is illustrated in tandem within a container employing the present invention. A plurality of disks 10 are mounted in an assembly including ringlike spacers 11 which maintain the disks spaced apart by a precise, predetermined distance. The disks and spacers are assembled together about a central support casting 12, called a hub, which is provided with a cylindrical outer surface 13. The bottom protective disk 14 is positioned at the bottom of the disk pack, and the disks 10 and the spacers 11 are stacked upon the hub. The disks and spacers are locked firmly in place on the cylindrical section between an annular stop 15 formed at the lower edge of the cylindrical section and a retaining cap 16 secured by a plurality of screws 17 to the upper edge of the hub.

The container for the disk pack includes a top dust cover 18 with a centrally located handle 19, and a bottom cover 20.

Figure 3:
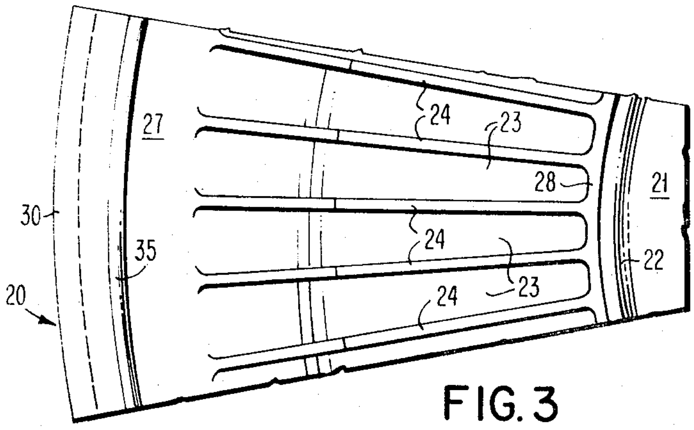
FIG. 3 is a top view of a portion of the bottom of the container.

An example of a disk pack together with means, including handle 19, or securing the disk pack to a disk file and means for securing a disk pack within the top dust cover 18 to the bottom cover 20 are described in detail in U.S. Pat. No. 3,176,281, R. E. Pattison, "Portable Memory for Data Processing Machine", issued Mar. 30, 1965 and in U.S. Pat. No. 3,206,214, E. G. Leary, "Transporting and Protecting Cases for Drum and Disk Records", issued Sept. 14, 1965. Referring to FIGS. 2 and 3, the bottom cover 20 is illustrated which embodies the present invention.

The bottom cover includes a flat portion 21 against which the hub 12 is in firm contact when the disk pack is attached to the bottom cover. Adjacent this central, flat portion 21 is a flexure point 22. From the flexure point, a downwardly extending resilient portion 23 is affixed. The portion 23 extends continuously around the central axis having an outer surface in the form of a truncated conical surface. The interior of the portion 23 has affixed thereto as part of a common casting, a plurality of strengthening ribs 24. Alternatively, the cross section of portion 23 may be made thicker to provide the additional strengthening. Affixed to the portion 23 is a cylindrical base 25 which extends continuously about the central axis. This cylindrical foot forms the surface upon which the disk pack may be rested on any flat surface 26. Additionally forming a part of the bottom cover 20 is an upwardly and outwardly extending portion 27 which, like portion 23, extends continuously about the central axis and forms an outer surface in the shape of a truncated conical surface. The ribs 24 are affixed at one end to the portion 27, along their entire length to portion 23, and at the other end to a bearing portion 28. All the described portions of bottom cover 20 comprise a common casting made of a semiresilient material, such as polycarbonate. Thus, the ribs 24 give added stiffness to portion 23, making the section 23 approximately twice as stiff as portion 27. The primary point of resiliency is flexure point 22.

Placed over the edge of bottom cover 20 is a resilient bumper and seal 30. This bumper is in the form of a ring which fits over the d edge of portion 27 of the bottom cover and includes a seal 31 which seals against the top cover 18 to thereby form a dust proof seal between the bottom and top covers. The bumper 30 may be constructed of any soft resilient material, such as rubber.

Designed in this manner, the bottom cover will absorb upward shock energy, for example from dropping the disk pack, by a limited flexing of portion 23 and ribs 24 and by a more extensive flexing of flexure point 22. The cylindrical foot portion 25 will thus move a limited amount in the direction of arrow 32. After a limited deflection, the bearing surface 28 comes into contact with the outer bearing surface 33 of the hub 12. Any additional load at the foot portion 25 results in a compression of portion 23 and ribs 24 between foot portion 25 and bearing surface 33. This compression produces forces by bearing portion 28 upon bearing surface 33 directed slightly upward and radially inward around the entire circumference of the hub 12. Deformation of portion 23 and ribs 24 causes the foot portion 25 to deflect in the direction of arrow 34. Given a deflection constant of approximately 3200 pounds per inch, the total deflection movement of cylindrical portion 25 for a pack weighing approximately 18 pounds after being dropped from a height of 10 inches is 0.3 inches. Thus, the force generated by dropping the disk pack is converted to a compression force about the entire circumference of the hub 12 and the energy absorbed by the deformation of the portions 23 and 24 of the bottom cover 20. Only a limited force will be transmitted vertically to the disks 10, and this force will be insufficient to cause bending or drooping of the disk.

If the disk pack is banged, for example, against the side of a cabinet, the shock load is transmitted by bumper ring 30 to the upwardly and outwardly extending portion 27 of the bottom cover 20. The force initially causes the collapse of flexure 22 on that side of hub 12, bringing bearing portion 28 into contact with bearing surface 33 of hub 12. Any additional load at bumper ring 30 results in a compression of portion 27, portion 23 and ribs 24 between bumper ring 30 and bearing surface 23. These portions of the bottom cover absorb the force by deforming at various rates therealong. The reason for the nonlinear deformation is due to both the presence of ribs 24, each having a nonuniform cross section along the portions 27 and 23 as well as the conically shaped surfaces thereof. The resultant deflection movement of the outer edge of the bottom cover occurs in the direction of arrow 35. This deflection, due partly to the lower stiffness of the portion 27, absorbs a major portion of the force from the shock, and only a small portion of the force is transmitted thereby to the hub 12 of the disk pack. Assuming a deflection constant of 1200 pounds per inch, an 18 pound disk pack banged with a sideways force equivalent to that of dropping the pack from a height of 7 inches results in a deflection by the outer edge of the bottom cover of 0.4 inches. This force can be absorbed without causing misalinement of the disk with respect to the hub 12.

Many alternative implementations of the disclosed resilient, annular protrusion 22, 23, 24, 25, 27 and 28 may be made. For example, the downwardly and outwardly extending portion 23 may be extended to a point beyond the top cover 18, thereby providing protection against impact energy from either the bottom or side of the container. This would convert the direction of deflection by the outer end thereof due to an impact at the side to a direction extending downward and inward rather than the upward and inward direction 35 illustrated with respect to the preferred embodiment.

While the invention has been particularly shown and described with reference to a preferred embodiment thereof, it will be understood by those skilled in the art that the foregoing and other changes in form and details may be made therein without departing from the spirit and scope of the invention.

I claim: —cm 1. In a container, energy absorbing means associated with the container base to protect the contents of the container from shock, comprising:

a central portion for mounting thereon an object comprising said contents of said container; and a resilient protrusion extending downwardly and outwardly from the perimeter of said central portion and having an outer extremity that is downwardly below the bottom surface of the base and outwardly beyond the outer perimeter of the walls of the container, said resilient protrusion being resiliently deformable and absorbing a substantial portion of impact energy applied to said container by deformation and arranged to transfer impact energy not absorbed thereby to the central part of said object adjacent said central portion.

2. The energy absorbing means of claim 1, wherein:

said resilient protrusion is annular.

3. The energy absorbing means of claim 2 wherein:

said object comprises a disk pack and said central part comprises the central hub thereof.

4. The energy absorbing means of claim 1, wherein:

said resilient protrusion includes a continuous circular foot depending downwardly from the outer extremity of said protrusion, the axis thereof intersecting the approximate center of gravity of said object when said object is mounted on said central portion.

5. The energy absorbing means of claim 4 wherein:

said central portion has a circular outer periphery and said object comprises a disk pack and said central part comprises the central hub thereof.

6. The energy absorbing means of claim 5, wherein:

said resilient protrusion is annular and has an outer downwardly directed continuous surface in the form of a truncated conical surface and has a central axis concentric with the axis of said circular foot and the axis of said circular outer periphery of said central portion, said axes intersecting the approximate center of gravity of said object when mounted on said central portion, whereby force from an impact exerted parallel to said axis and uniformly along said foot portion is directed approximately toward said central part of said object.

7. The energy absorbing means of claim 6, wherein:

said energy absorbing means forms the bottom portion of said container and said bottom portion is separable from the remainder of said container.

8. The energy absorbing means of claim 7, wherein said resilient protrusion comprises sealing means for sealing said bottom portion of said container against said remainder of said container.

9. A container for a disk pack comprising:

a top cover including a circular top plate and an annular side wall depending downwardly from the outer extremity thereof;

a resiliently deformable bottom cover including a central portion having a top bearing surface for bearing against the bottom surface of the hub of the associated disk pack;

a resilient annular portion depending downwardly and outwardly from and joined to the outer periphery of said central portion;

the periphery of said annular portion having a diameter greater than the outer diameter of said annular side wall of said top cover; and means for connecting said top cover to said bottom cover, whereby a force applied to the bottom surface of said bottom cover or peripherally thereto is substantially absorbed by the deformation of the resilient annular portion, the unabsorbed force being transmitted through said annular portion and said central portion to the associated disk pack and dissipated therein, thereby to protect the contained disk pack against direct transmission of forces through the outer walls of the container to the contained disk pack.